E. TESTE & E. MALIVERT.
AUTOMOBILE HORN.
APPLICATION FILED AUG. 19, 1913.
1,281,877.
Patented Oct. 15, 1918.
3 SHEETS—SHEET 1.
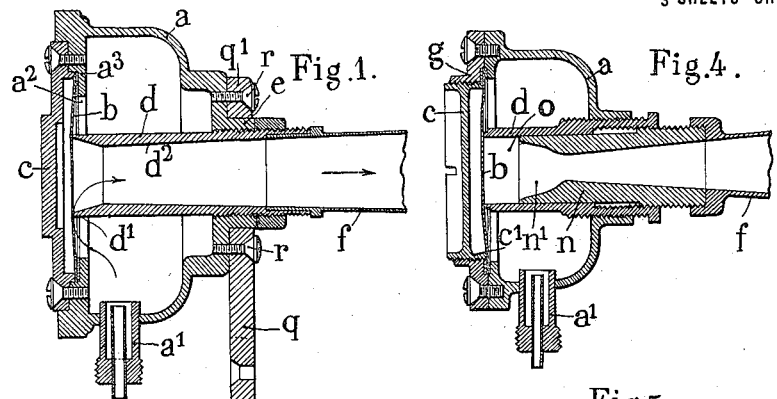
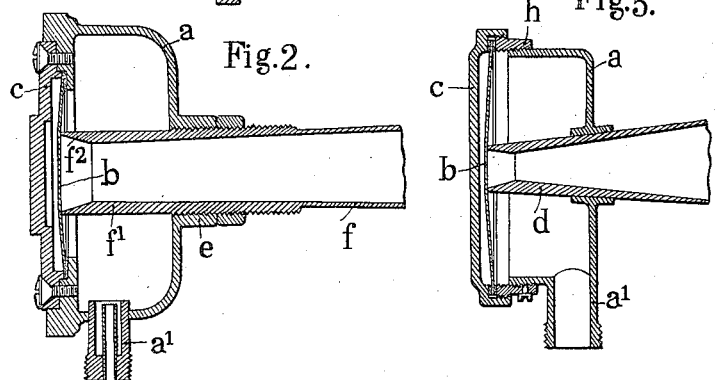
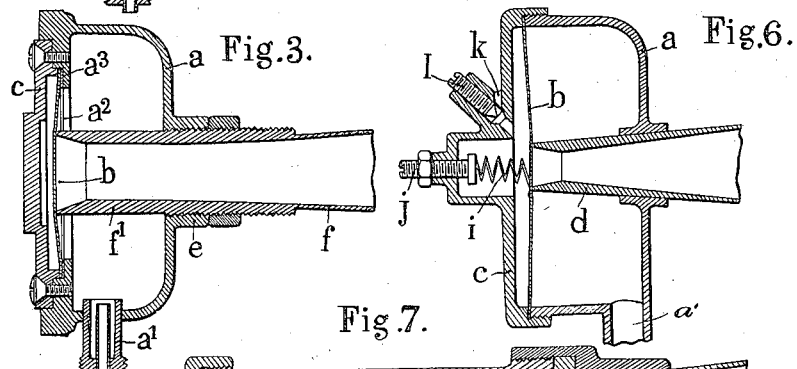
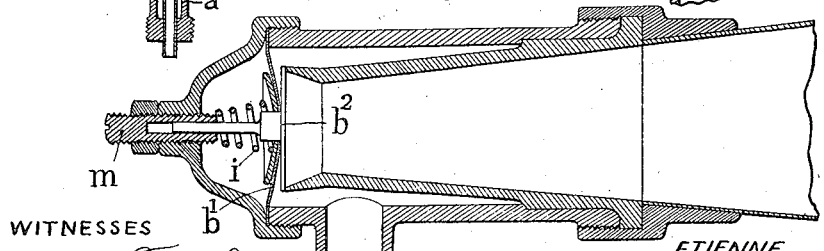
WITNESSES
W. T. Baker Jr.
B. Joffe
INVENTORS
ETIENNE TESTE
EUGÈNE MALIVERT
BY Munn & Co
ATTORNEYS E. TESTE & E. MALIVERT.
AUTOMOBILE HORN.
APPLICATION FILED AUG. 19, 1913.
1,281,877.
Patented Oct. 15, 1918.
3 SHEETS—SHEET 2.
Fig. 8.
Fig. 9.
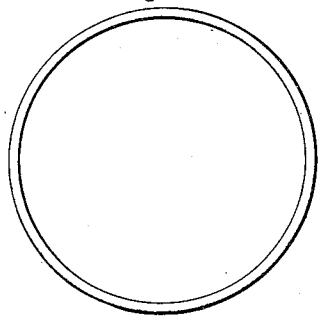
Fig. 19.
Fig. 20.
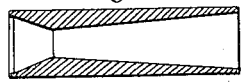
Fig. 10.
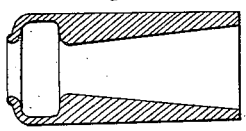
Fig. 11.
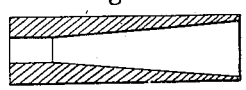
Fig. 12.
Fig. 13.
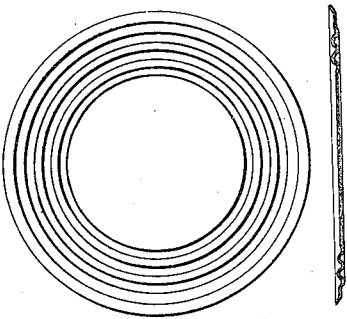
Fig. 21.      Fig. 22.
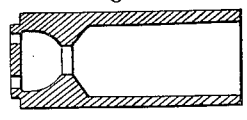
Fig. 14.
Fig. 15.
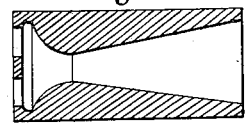
Fig. 16.
Fig. 17.
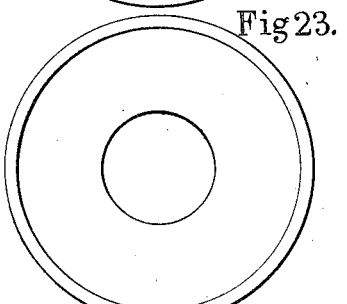
Fig. 23.      Fig. 24.
Fig. 18.
Fig. 26.
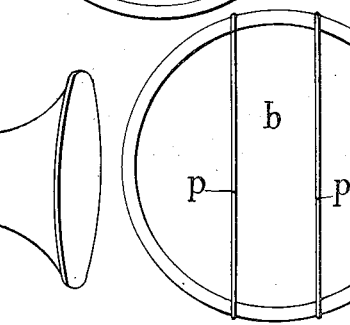
Fig. 25
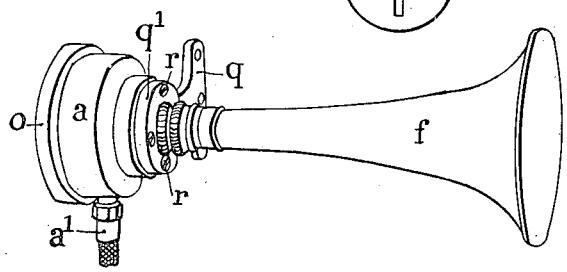
WITNESSES
W G Baker Jr.
B. Joffe
INVENTORS
ETIENNE  TESTE
EUGÉNE  MALIVERT
BY
ATTORNEYS

E. TESTE & E. MALIVERT.
AUTOMOBILE HORN.
APPLICATION FILED AUG. 19, 1913.

1,281,877.

Patented Oct. 15, 1918.
3 SHEETS—SHEET 3.

WITNESSES

INVENTORS
ETIENNE TESTE
EUGÈNE MALIVERT

BY
ATTORNEYS

UNITED STATES PATENT OFFICE.

ETIENNE TESTE AND EUGÈNE MALIVERT, OF PARIS, FRANCE.

AUTOMOBILE-HORN.

1,281,877.           Specification of Letters Patent.           Patented Oct. 15, 1918.

Application filed August 19, 1913. Serial No. 785,581.

*To all whom it may concern:*

Be it known that we, ETIENNE TESTE, of 28 Cité Lemière, and EUGÈNE MALIVERT, of 17 Rue du Pré Saint-Gervais, both in the city of Paris, Republic of France, have invented Improvements in Automobile-Horns Applicable to Wind Instruments Generally, of which the following is a full, clear, and exact description.

The present invention relates to a sound generating apparatus, particularly applicable to automobile horns.

This sound generating apparatus is of the vibrating apparatus type, comprising a flexible membrane caused to vibrate by the action of air or other fluid under pressure, the current of air being allowed to flow only in the form of an undulatory current.

The present apparatus comprises a chamber for the reception of the fluid injected, a space of discharge constituted by a trumpet and an operating or vibrating member covering the exhaust orifice opening into the trumpet, the fluid under pressure in order to reach the trumpet moving the operating member to uncover the exhaust orifice.

The essential feature of the present invention consists in an operating surface constituted by a thin membrane, or diaphragm, taut, and preferably metallic and causing an elastic pressure, regulated at will, on the end of the mouth piece of a trumpet, or inversely.

The putting of the said apparatus in operation comprises the two following phases;

*a*,—The air sent into the reception chamber cannot escape through the trumpet until the moment at which its pressure has become sufficiently strong to overcome the opposed resistance of the membrane or diaphragm.

*b*,—The moment this resistance is overcome there is produced between said membrane or diaphragm and the edge of the tube of the trumpet, an orifice elastically regulated through which the air enters the trumpet by brusk and successive discharges.

By its especial combination the present apparatus is susceptible of producing very powerful or very soft sounds of a pitch far more agreeable than that of the sounds produced by the existing reed apparatus.

In the present apparatus the nature of the sounds produced is varied at will by regulating the pressure of the membrane or diaphragm at the end of the outlet of the air tube, either by adjusting the latter in regard to the peripheral resting surface of the diaphragm or by regulating a pressure member, for instance, a spring for pushing one of the members, the membrane or diaphragm for instance, against the other, (the end of the mouth piece of the trumpet).

Furthermore the sound produced whatever be its power, has also a very agreeable pitch because of the fact that the end of the air tube on which is applied the membrane or diaphragm, constitutes the mouthpiece of the trumpet or resonance tube.

In the annexed drawings, Figures 1, 2, 3, 4, 5, 6 and 7 show in longitudinal section different variants of the apparatus.

Figs. 8 to 18 are detail views showing different forms of the mouthpiece of the air return tube secured to the sound amplifying trumpet or resonator.

Figs. 19 to 24 are detail views showing in elevation and section three forms of membrane.

Fig. 25 shows a membrane over which are stretched tone giving strings.

Fig. 26 shows in perspective an exterior view of the apparatus furnished with a conical trumpet.

Figure 27:
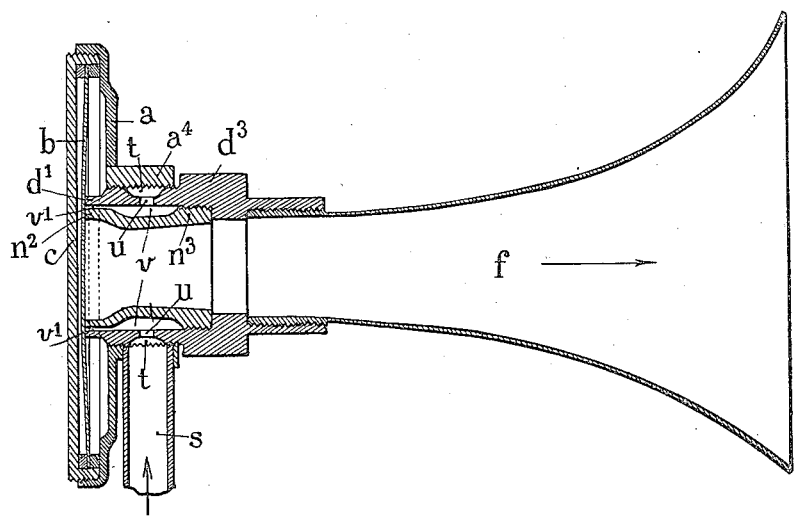
Fig. 27 shows in longitudinal section another modified form.

As will be seen in Fig. 1, the apparatus comprises a box *a* constituting an air chamber and furnished with a nipple $a^1$ to which is secured the pipe through which compressed air is supplied either by an india rubber bulb, by a small pump, or by any suitable reservoir containing air under pressure.

The body of the box is furnished with a circular opening $a^2$ covered by a vibrating membrane *b* clamped throughout its circumference between a flange $a^3$ of the box $a^1$ and a cover *c* which is fixed in place either by screws, by being screwed on the box or otherwise. The internal face of the cover is hollowed out in order to permit the free play of the membrane.

*d* is a tube which is mounted so as to extend within the box $a$ normal to the plane of the membrane $b$, with its front end $d^1$ bearing against the latter. This tube screws into a screw-threaded sleeve $e$ provided at the inside of the box $a$, in order that by screwing the tube $d$ more or less into the sleeve $e$ the degree of pressure exerted by its extremity $d^1$ upon the membrane $b$ may be regulated, and as a result, the tension of the latter may be adjusted. Upon the tube $d$ is mounted the amplifying trumpet $f$ or resonator of the apparatus for generating sound. By preference the internal surface $d^2$ of the tube $d$ is coned in order that it shall form a continuation of the internal surface of the trumpet $f$, so that the tube $d$ thus constitutes the rear portion of this trumpet. Furthermore, the rear extremity $d^1$ is beveled as shown so as to form a conical mouth the edge of which bears at all points on the membrane.

Figs. 2 and 3 show two modifications in which the tube which bears against the membrane $b$ is constituted by the extremity of the tube $f^1$ of the trumpet $f$, which extremity may either be coned internally as in Fig. 2 or cylindrical as in Fig. 3.

The membrane may also be adjusted against the extremity of the tube $d$ (or the extension $f^1$) of the trumpet $f$ by the pressure of the cover $c$ acting on its other face as shown in Fig. 4. In this arrangement the membrane $b$ is clamped throughout its circumference between the box $a$ and a ring $g$ which is fixed to the box and threaded interiorly to receive the bottom or cover $c$ and provided on its rear face with an annular rim $c^1$. As thus constituted, the membrane $b$ receives, at the center portion of one of its faces, the pressure of the tube $d$ and upon its other face throughout its circumference, the pressure of the cover $c$, and hence by screwing up more or less the tube $d$ or the cover $c$ the tension of the membrane may be regulated.

The tube $d$ screwed into the box, and whose rear extremity bears against the membrane $b$ may be fitted, as shown in Fig. 4, with a tube $n$ so formed as to constitute a mouthpiece $n^1$, the tube $n$ being screwed into the tube $d$ in such manner that by screwing it in either direction, the capacity of the chamber comprised between the membrane $b$ and the mouthpiece $n^1$ may be varied to obtain grave or acute sounds. The trumpet $f$ or resonator of the instrument is mounted on the tube $n$.

The tension of the membrane may also be effected by the displacement of the membrane itself as shown in Fig. 5. In this case the membrane is fixed throughout its circumference between the cover $c$ and a screw-threaded ring $h$ screwed thereon, the ring $h$ itself being threaded interiorly and screwed on the box $a$. By screwing up more or less the combined cover and ring $h$ on the box $a$ the membrane $b$ is applied with more or less force against the extremity of the tube $d$ which is integral with the trumpet and may be fixed to or adjustably mounted on the box $a$.

The membrane may furthermore be applied against the extremity of the tube $d$ by the pressure of a return spring $i$ (Fig. 6) which, by preference, takes an abutment against the extremity of the tension screw $j$ carried by the cover $c$, this arrangement enabling the pressure of the spring $i$, and consequently the force with which the membrane $b$ bears against the extremity of the tube $d$, to be varied and which is integral with the trumpet. The cover $c$ in this case may be provided with a number of vents $k$ capable of being opened or closed more or less by screw pins $l$ so as to avoid, within the cover, any compressive action which would be prejudicial to the satisfactory working of the membrane.

The diaphragm instead of being metallic, can be constituted of a soft substance $b^1$, for instance skin tissue, etc., carrying a valve $b^2$; the whole of this soft diaphragm $b^1$ and of this valve $b^2$ is regulated by a tension spring $i$ under the effect of which the valve $b^2$ is maintained applied on the mouthpiece of the tube. This valve $b^2$ has a stem engaged in a tubular piece $m$ screwed in a tube presented by the cover of the instrument; the tubular piece $m$ serving at the same time as a guide for the stem of the valve and as an abutment for the tension spring $i$ of the latter.

The mouthpiece formed either by the extremity of the tube $d$ or the extremity of the tube $n$ may have the shape of the mouthpiece usually employed in wind instruments. The entrance end of the mouthpiece may be of circular form and have a cavity which is hemispherical, as shown in Figs. 8 and 9; or conical, as shown in Fig. 10; or the cavity may be cylindrical as shown in Fig. 11, with an internal diameter greater than that of the entrance end; or again, it may have an opening of rectangular form as shown in Figs. 12 and 13. Furthermore, instead of a single orifice, the entrance end of the mouthpiece may present a number of openings each of circular form as shown in Figs. 14 and 15, or as shown in Figs. 16 and 17, of radial dovetail form, or as shown in Fig. 18, in the form of parallel slits.

The membrane $b$ consists of a very thin metal disk (for example a tenth of a millimeter), as shown in Figs. 19 and 20, whose periphery may be slightly curved. This disk may be furnished with a series of concentric grooves around its margin, as shown in Figs. 21 and 22, or it may be provided with a raised pressed-up portion as shown in Figs. 23 and 24, in order that the portion of the disk which is to come into contact with the tube $d$ shall be perfectly flat and indeformable.

The diaphragm may be of any desired form.

In order to modify the number of vibrations of the membrane and consequently the tone emitted, metallic or other strings $p$ may be stretched over the face of the membrane as shown in Fig. 25.

In the case of a horn, the apparatus may be attached to the vehicle by means of a bracket $g$ (Figs. 1 and 26) integral with a collar $g^1$ which is attached to the sleeve $e$ of the box $a$, and secured to the latter by means of screws $r$. By this arrangement the position of the bracket $g$ relatively to the air supply tube $a^1$ may be varied at will.

Figure 28:
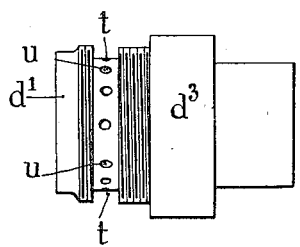
Fig. 28 is a detail view.

Figs. 27 and 28 show a modification in which the membrane is applied against two concentric seats $d^1$ $n^2$ separated by an annular space through which the air acting on the membrane passes. The seat $d^1$ is formed by the edge of a sleeve $d^3$, and the seat $n^2$ by the edge of a liner $n^3$ screwed into the sleeve $d^3$. The sleeve $d^3$ screws into the ring $a^4$ integral with the box $a$, so that the two seats $d^1$ $n^2$ may be applied against the vibrating membrane with the desired pressure.

$s$ is the conduit for the compressed air which is secured to the ring $a^4$ and opens out into a circular channel $t$ between the ring and the sleeve $d^3$. $u$ are orifices in the sleeve $d^2$ whereby this channel communicates with the annular space $v$ between the sleeve $d^3$ and the liner $n^3$. A trumpet $f$ or a resonator of any kind is mounted on the sleeve $d^3$. The compressed air delivered by the tube $s$ enters the circular groove $t$, through the orifices $u$, and filling the annular channel $v$ passes through the orifice $v^1$ and strikes the membrane $b$ which, as before stated, rests against the two concentric seats $d^1$ $n^2$. The current of air modified by the vibrations of the membrane produces, as it escapes through the trumpet $f$ a very powerful sound.

The trumpet or resonator will have different forms according to the purpose for which the sound generated is to be employed. This trumpet or resonator may be straight or curved, may be of conical form, or constituted by a cylindrical pipe similar to an organ pipe.

The trumpet may in certain cases be replaced by a cornet of any usual type.

Owing to the fact that the apparatus of this invention permits the pressure of the membrane against the extremity of the air discharge tube to be regulated at will according to the pressure of the air supplied, it is possible to actuate the apparatus with exceedingly variable air pressures without the risk of blocking the membrane.

Furthermore, the present apparatus owing to its general construction enables grave or acute sounds of a power considerably greater than those of instruments at present in use and, when desired, very soft sounds to be produced.

The apparatus, owing to the numerous advantages it possesses, is adapted for numerous industrial applications, i. e. it may, as already stated, be employed as an automobile horn, or as a signal, or it may be applied to musical wind instruments notably organs in which latter application the invention, as it enables the length of the pipes to be considerably lessened, has for effect to decrease the dimensions of the instrument.

The material of which the membrane is made, its thickness, its elasticity, and the pressure with which it is caused to bear against the air leading in tube, will vary according to the particular application of the apparatus.

Claims:

1. A sound generator comprising a box constituting an air inlet chamber, a compressed air supply pipe, a nipple on said air inlet chamber adapted to receive the compressed air supply pipe, the said air inlet chamber presenting an opening in one of its faces, a thin flexible membrane covering said opening, means for securing said flexible membrane, an air outlet tube passing through the air inlet chamber, and means pressing the inlet end of said tube and the membrane against one another.

2. A sound generator, comprising a box constituting an air inlet chamber, a compressed air supply pipe, a nipple on said chamber adapted to receive the compressed air supply pipe, the said air inlet chamber presenting an opening on one of its faces, a thin flexible membrane covering said opening, means for securing said flexible membrane in position, an air outlet tube passing through the air inlet chamber and means for causing the inlet end of said tube and the said membrane to press one on the other, and to allow of the regulating of said pressure.

3. A sound generator comprising a box constituting an air inlet chamber provided with a nipple, a compressed air supply pipe secured to said nipple, the air-inlet chamber presenting an opening on one of its faces, a thin flexible membrane covering said opening, means for securing said flexible membrane in position, a sound amplifying trumpet, an air outlet tube passing through the air inlet chamber, and forming the mouth piece and the commencement of the tube of said trumpet, the membrane being held under tension against the inlet end of said outlet tube, and means for regulating at will the pressure with which the membrane presses against the end of the tube.

4. A sound generator, comprising a box constituting an air inlet chamber, a compressed air supply pipe, the said air inlet chamber presenting an opening in one of its faces, a thin flexible membrane covering said opening and resting throughout its circumference on the edge of said opening, a cover secured on the air inlet chamber and clamping the circumference of the membrane on the edge of the opening in said chamber, a sound amplifying trumpet having a resonator or tube, an air outlet tube passing through the air inlet chamber, the said air outlet tube extending rearwardly from the tube of the trumpet and forming a continuation thereof, the rear end of said outlet tube being adapted to press upon the flexible membrane, and an adjustable tension means for regulating the pressure of the outlet tube on the memberane, the said air outlet tube constituting the commencement of the said resonator or tube of the sound amplifying trumpet.

5. A sound generator, comprising a box constituting an air inlet chamber, and presenting an opening on one of its faces, a compressed air supply pipe connected with said chamber, a flexible membrane covering the opening of said air inlet chamber, means for securing said flexible membrane, an air outlet tube passing through the air inlet chamber, the inner end of said tube being arranged to engage the said membrane, tension means for pressing the inner end of said tube and the membrane, one directly on the other and means for regulating the tension means.

6. A sound generator, comprising a box constituting an air inlet chamber, a compressed air supply pipe, the said inlet chamber presenting an opening on one of its faces, a flexible membrane covering said opening, means for clamping the circumference of the flexible membrane on the edge of the opening in said chamber, a sound amplifying trumpet having a tube, and an air outlet tube extending rearwardly from the trumpet tube and passing through the air inlet chamber and forming the inlet orifice for the tube of the trumpet, and means for causing the flexible membrane and the inlet orifice of said air outlet tube to bear with positive pressure one upon the other, and for varying said pressure.

7. A sound generator, comprising a box constituting an air inlet chamber, the said inlet chamber presenting an opening on one of its faces, a flexible membrane covering said opening, means for clamping the circumference of the flexible membrane, a sound amplifying trumpet connected with said air inlet chamber and projecting therefrom, an air outlet tube extending rearwardly from the tube of the trumpet and passing through the air inlet chamber, the inlet orifice of said tube being at the rear end of the latter and forming the commencement of the tube of the sound amplifying trumpet, the said outlet tube being so arranged that the flexible membrane may press upon its inlet orifice, and means for regulating said pressure.

8. A sound generator comprising a box constituting an air inlet chamber provided with a nipple adapted to receive the compressed air supply pipe and presenting an opening on one of its faces, a flexible membrane covering said opening, a cover secured on the air inlet chamber and clamping between itself and the edge of the opening in said chamber the circumference of the membrane, an air outlet tube passing through the air inlet chamber, a tension spring for causing the rear or inlet end of said tube and the membrane to press one upon the other, and means for the regulation of the tension of said spring.

9. A sound generator, comprising an air inlet chamber provided with a side nipple, a compressed air supply pipe secured to said nipple, the said air chamber having an opening on one of its faces, a flexible diaphragm covering said opening, an outlet chamber for the air open at its ends and having its inner end arranged within the said air chamber and projecting at its outer end therefrom, the said outlet chamber forming a sound amplifying trumpet, a tension device for causing the diaphragm to press on the inner end of said outlet chamber, and means for increasing or decreasing the tension of said device.

10. In a sound generator, an air chamber having an air inlet, a flexible membrane in said chamber, a resonator tube projecting at its outer end from said chamber and forming an air outlet tube, the inner end of said air outlet tube bearing directly against the membrane, and adjustable tension means for regulating at will the pressure between the membrane and the air outlet tube according to the pressure of the air supplied.

11. In a sound generator, an air chamber, a flexible membrane in said chamber, a sound amplifying tube projecting at its outer end from said chamber and forming an air outlet tube, the inner end of said tube bearing against the front side of said membrane, a tension spring for pressing the membrane against the end of the tube, means for regulating the tension of said spring, and means for venting the air chamber, at the rear side of the flexible membrane.

12. In a sound generator, an air inlet chamber, having an opening in one of its faces, a flexible membrane covering said opening, a cover secured on the air inlet chamber and clamping the membrane in position over said opening, a sound amplifying tube projecting at its outer end from said chamber, and forming an air outlet tube, the inner end of said tube bearing on the membrane, a tension spring between the cover and the membrane for pressing the membrane against the inner end of said tube, and adjustable means carried by the cover, for regulating the tension of said spring.

13. In a sound generator, an air inlet chamber having an opening in one of its faces, a flexible membrane covering said opening, a cover secured on the air inlet chamber and clamping the membrane in position over said opening, the body of the cover being spaced from the membrane, a sound amplifying tube projecting at its outer end from said air inlet chamber and forming an air outlet tube, the inner end of said tube bearing on said membrane and forming the inlet for the air from said chamber, a tension spring between the cover and the membrane for pressing the membrane against the inner end of said tube, means for regulating the tension of said spring, the said cover being provided with vent openings for venting the space between the cover and the membrane, and means for regulating the opening and closing of said vent openings.

The foregoing specification of our improvements in automobile horns is applicable to wind-instruments generally, signed by us, this fifth day of August, 1913.

ETIENNE TESTE.
EUGÈNE MALIVERT.

Witnesses:
HANSON C. COXE,
RENÉ THIRIOT.